United States Patent [19]
Kaneyama

[11] Patent Number: 5,146,348
[45] Date of Patent: Sep. 8, 1992

[54] STORE-AND-FORWARD SWITCHING SYSTEM

[75] Inventor: Yoshinobu Kaneyama, Yono, Japan

[73] Assignee: Kabushiki Kaisha Toshiba, Kawasaki, Japan

[21] Appl. No.: 746,978

[22] Filed: Aug. 19, 1991

[30] Foreign Application Priority Data

Aug. 20, 1990 [JP] Japan .................................. 2-217169
Aug. 24, 1990 [JP] Japan .................................. 2-221193

[51] Int. Cl.⁵ ...................... H04N 1/32; H04N 1/23; H04M 11/00
[52] U.S. Cl. .................... 358/407; 358/436; 358/296; 379/96; 379/100
[58] Field of Search .............. 358/407, 402, 434, 435, 358/436, 442, 438, 439, 296; 379/93, 96, 100

[56] References Cited

U.S. PATENT DOCUMENTS 4,870,678  9/1989  Adachi ................................. 358/434
4,994,926  2/1991  Gordon ................................. 358/407

Primary Examiner—Benjamin R. Fuller
Assistant Examiner—Scott A. Rogers
Attorney, Agent, or Firm—Finnegan, Henderson Farabow, Garrett and Dunner

[57] ABSTRACT

A method of controlling a store-and-forward switching system comprising a store-and-forward switching central unit and a plurality of terminal units comprising the steps of detecting a call from a terminal unit through a communication control unit for controlling communication between the central unit and the terminal units, inputting a request for a normal-priotity multi-destination delivery communication service from a terminal unit, reading a service attribute table from an external storage unit and loading it into a memory, referring to the service attribute table on the memory to determine whether or not the normal-priority multi-destination delivery communication service is granted to the terminal unit, determining that the normal-priotity multi-destination delivery communication service is granted to the terminal unit on the basis of a value of predetermined data in the service attribute table, performing pre-processing of protocol communication with the terminal unit through a communication control unit, receiving image data from the terminal unit via the communication control unit and storing it in said external storage unit, performing post-processing of said protocol communication through the communication control unit to disconnect a line, and writing latest communication results into a predetermined area of a memory and then terminating a series of processing steps.

12 Claims, 6 Drawing Sheets

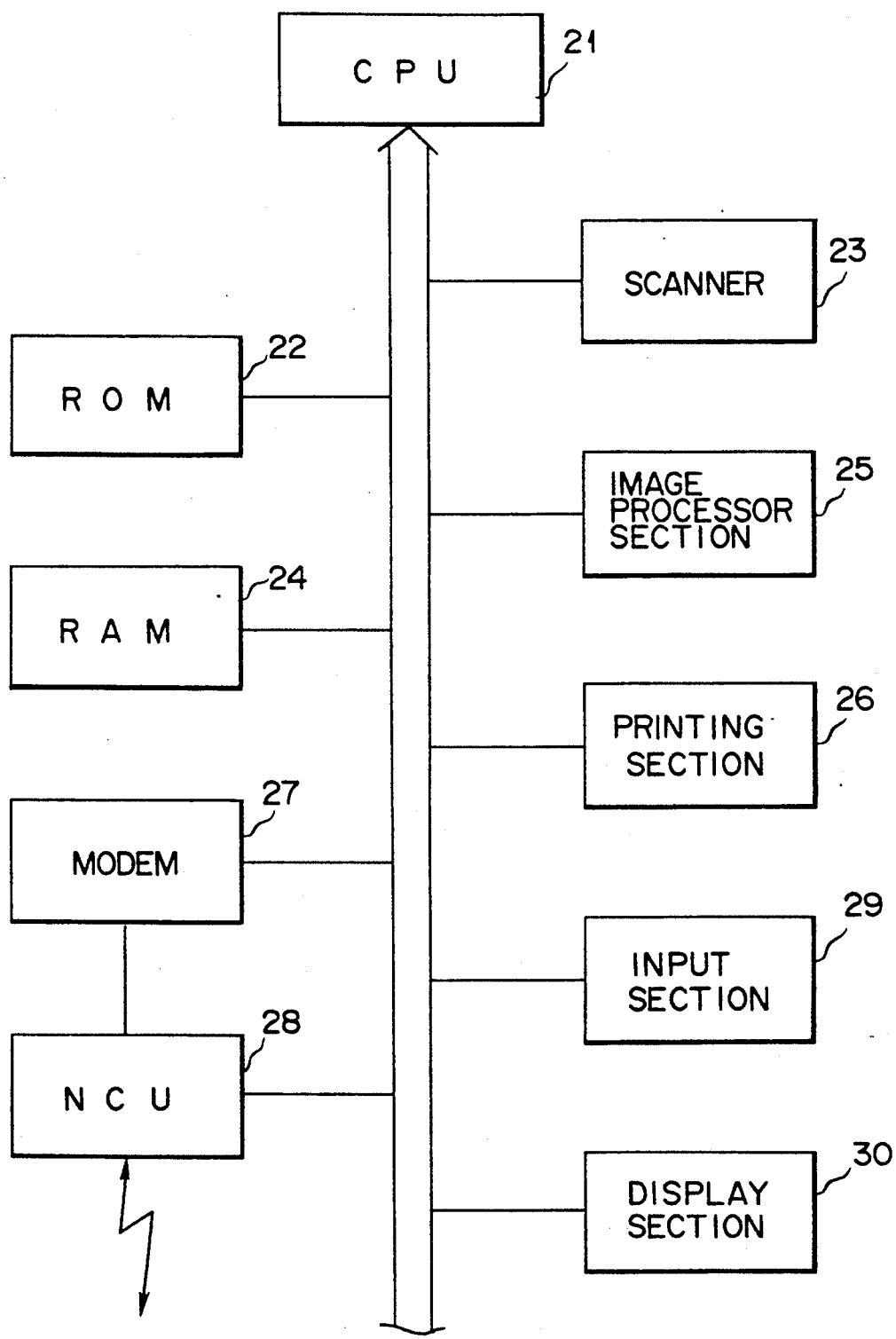
F I G. 2

TERMINAL SERVICE ATTRIBUTE TABLE (A)

| TERMINAL NO. \ SERVICE | AGENCY | CONCURRENT | | | INFO. BOX | P.O. BOX | CONFIDENTIAL | COLLECT | |
|---|---|---|---|---|---|---|---|---|---|
| | | NORMAL-PRIORITY | HIGH-PRIORITY | SUPER HIGH-PRIORITY | | | | | |
| TERM.31 | ON | ON | ON | ON | ON | ON | ON | ON | ---- |
| TERM.32 | ON | ON | ON | OFF | ON | OFF | OFF | OFF | ---- |
| TERM.33 | ON | ON | ON | OFF | OFF | ON | ON | OFF | ---- |
| TERM.34 | ON | ON | OFF | OFF | OFF | OFF | OFF | OFF | ---- |
| ⋮ | ⋮ | ⋮ | ⋮ | ⋮ | ⋮ | ⋮ | ⋮ | ⋮ | ---- |
| TERM.nn | ON | ON | OFF | OFF | OFF | OFF | OFF | OFF | ---- |

FIG. 3A

TERMINAL SERVICE ATTRIBUTE TABLE (B)

| TERMINAL NO. \ SERVICE | AGENCY | CONCURRENT | | | INFO. BOX | P.O. BOX | CONFIDENTIAL | COLLECT | |
|---|---|---|---|---|---|---|---|---|---|
| | | NORMAL-PRIORITY | HIGH-PRIORITY | SUPER HIGH-PRIORITY | | | | | |
| TERM.31 | ON | ON | ON | ON | ON | ON | ON | ON | ---- |
| TERM.32 | ON | ON | ON | OFF | ON | OFF | OFF | OFF | ---- |
| TERM.33 | ON | ON | ON | OFF | OFF | ON | ON | OFF | ---- |
| TERM.34 | ON | ON | ON | OFF | OFF | OFF | OFF | OFF | ---- |
| ⋮ | ⋮ | ⋮ | ⋮ | ⋮ | ⋮ | ⋮ | ⋮ | ⋮ | ---- |
| TERM.nn | ON | ON | OFF | OFF | OFF | OFF | OFF | OFF | ---- |

FIG. 3B

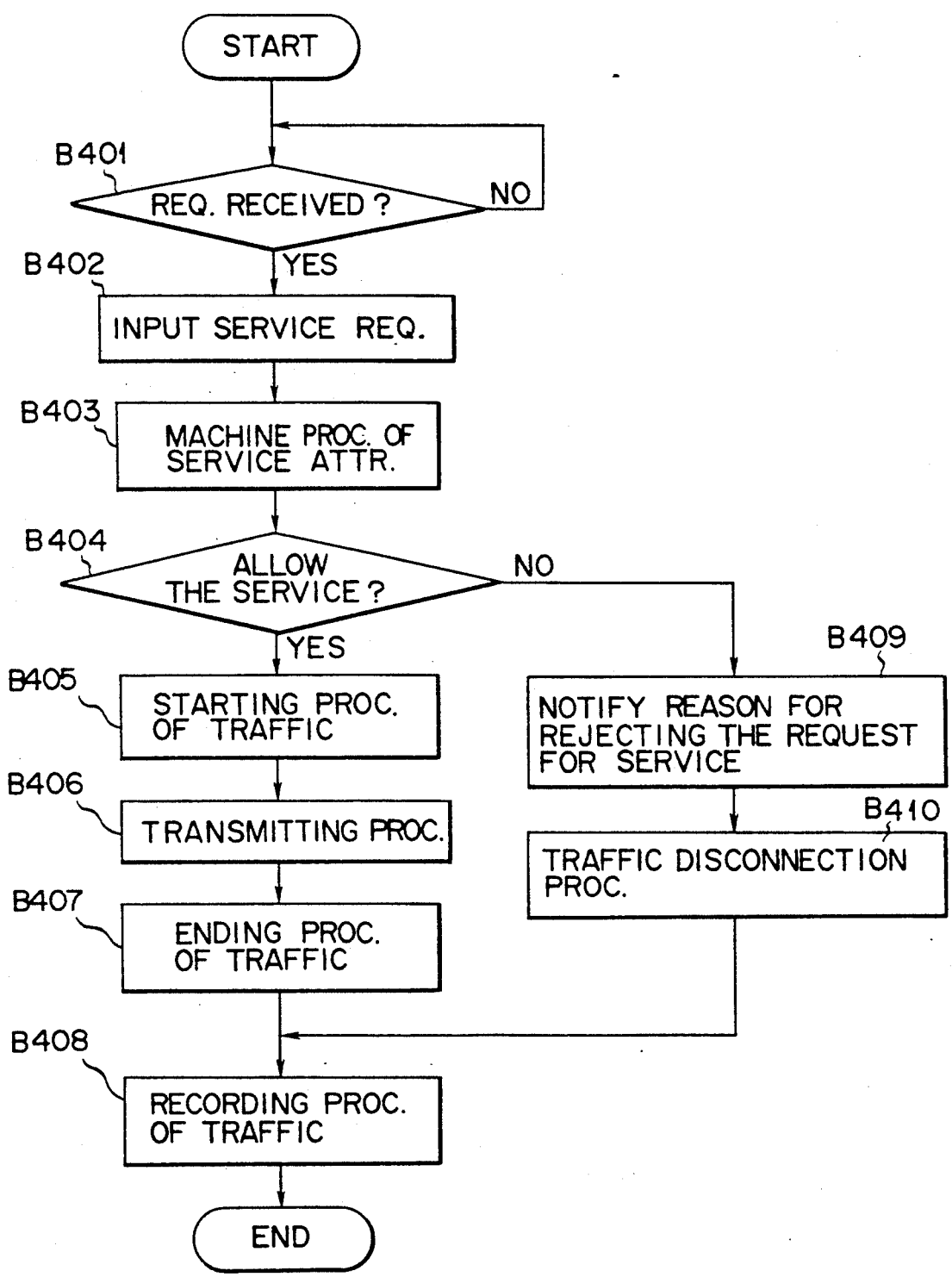
F I G. 4B

```
         MENU
  1: ALTERNATE    4: P.O.BOX
  2: MULTI        5: CONFIDENTIAL
  3: INFO. BOX    6: COLLECT
         SELECT  ▷
```

FIG. 5

```
         MENU
      1: ALTERNATE
      2: MULTI
      3: INFO.BOX
         SELECT  ▷
```

FIG. 6

```
         MENU
  1: ALTERNATE    4: CONFIDENTIAL
  2: MULTI
  3: P.O. BOX
         SELECT  ▷
```

FIG. 7

STORE-AND-FORWARD SWITCHING SYSTEM

BACKGROUND OF THE INVENTION

1. Field of the Invention

The present invention relates to a store-and-forward switching system and, more particularly, to a store-and-forward switching system which is configured to define types of services which can be provided to each of terminal units.

2. Description of the Related Art

A conventional store-and-forward switching system is configured such that a plurality of facsimile terminal units are coupled to a facsimile store-and-forward switching unit (i.e. central unit) through a network. In such a system, all of services, such as Alternate recipient communication, Multi-destination delivery communication, information-box communication, P.O.-box communication, etc., that the central unit can provide are open to all the terminal units, and any terminal unit is free to request the central unit to provide all the services.

Thus, many terminal units may request the central unit to provide the same kind of service at the same time. In case where such simultaneous requests are made for Multi-destination delivery communication, a problem will arise in that it takes a long time to transmit information (e.g., information upon which a communication service request is made) requested by each terminal.

A concrete example of the case where such a problem arises is as follows. The Multi-destination delivery communication services are ranked according to priorities into SUPER HIGH-PRIORITY multi-destination delivery communication, HIGH-PRIORITY multi-destination delivery communication, NORMAL-PRIORITY multi-destination delivery communication, etc. For example, the system is constructed such that, when the central unit receives a service request for urgent multi-destination delivery communication from a terminal unit in the middle of the NORMAL-PRIORITY multi-destination delivery communication with another terminal unit, the central unit interrupts the NORMAL-PRIORITY multi-destination delivery communication and provides the SUPER HIGH-PRIORITY multi-destination delivery communication service. If, however, the right to accept the SUPER HIGH-PRIORITY multi-destination delivery service is provided to all the terminals, there will be the possibility that all the terminal units make a request for the SUPER HIGH-PRIORITY multi-destination delivery communication to the central unit. When such a situation occurs, the requests for the multi-destination delivery communication service of the same rank will increase and sometimes only the request for multi-destination communication of the same rank will be present. Thus, the ranking of the multi-destination delivery communication services becomes insignificant. As a result, a problem will arise in that the multi-destination delivery communication which is effective in case of urgency does not function properly.

As one of measures to solve such problems as described above, it will be considered to prohibit the central unit from performing the urgent multi-destination delivery communication service. However, when such a measure is taken, any terminal unit will not be able to send any urgent multi-destination delivery communications when necessary. Therefore, the multi-delivery communications function in case of urgent cannot be performed properly and any solutions of the problems cannot be brought about. Conversely, if a measure were taken at the terminal site to prohibit a predetermined type of service, then complicated control therefor would have to be performed. For example, a part, such as a magnetic card, would have to be added. This would increase the cost of each terminal. In addition concerning the system operation as well, there would be arisen a problem of such a complicated system operation that a desired service could not be provided without entering a password.

As described above, with the conventional store-and-forward switching system, since any terminal unit is given the right to cause the central unit to perform all the services, a situation can occur in which many requests for the same kind of service occur at the same time. As a result, a problem arises in that processes are delayed in the central unit, a requested service is not performed for a long time and the system performance is degraded. For example, in case where each of the terminal units makes a request for the SUPER HIGH-PRIORITY multi-destination delivery communication at the same time, its transmission will take a long time. That is, the SUPER HIGH-PRIORITY multi-destination delivery communication will be meaningless.

SUMMARY OF THE INVENTION

It is therefore an object of the present invention to provide a store-and-forward switching system which is configured as follows.

It is an object of the present invention to provide a store-and-forward switching system which permits prevention of the degradation of performance due to an overflow of service, by beforehand storing the data permitting the definition of the type of communication service.

Concretely, there are two systems as follows:

one system configured so as to check the type of requested communication service, and accept only the type of permitted service; and the other system with the data loadable terminal unit, which is configured so as to down-load type data being permitted and stored by a central unit in order to notify the type of communication service permitted to the operator of the terminal.

Furthermore, it is another object of the present invention to configure the system so as to be used easily by eliminating the necessity of a complicated operation and to employ part of existing devices for a system constituent element, thereby eliminating the necessity of addition of new parts which are complex in structure.

To attain the above object, the present system is configured as follows.

The store-and-forward switching system of the first embodiment of the present invention is a store-and-forward switching system in which a plurality of terminal units (e.g., facsimile terminal units) capable of loading data are coupled through a network to a store-and-forward switching unit (e.g., a central unit), the store-and-forward switching unit, after receiving from a terminal unit a request for a communication service and data on which the requested communication service is to be performed, temporarily stores them in a storage unit (e.g., an external memory or a disk unit), reads the data stored in accordance with the corresponding communication service and performs a process specified by the communication service on the data. More specifically, the store-and-forward switching unit comprises data producing means for producing data for defining types of services which can be granted to each of the terminal units and control data needed in order for the terminal unit to perform the granted service as loading data; and loading means for transmitting the loading data produced by the data producing means to load it into the terminal unit, and each of the terminal units comprises display means responsive to the loading data loaded by the store-and-forward switching unit for displaying types of services which are granted to itself; and control means responsive to the loading data loaded by the store-and-forward switching unit for making a request to the store-and-forward switching unit for a communication service.

A store-and-forward switching system of the present invention comprises data holding means for holding data for defining types of services which are granted to each of terminal units; determining means for making a reference to the data held by the data holding means and determining whether or not a communication service requested by a terminal unit is granted thereto; and receiving means for receiving communication data from the terminal unit only when the determining means determines that the communication service requested by the terminal unit is granted thereto.

The following means may be added.

(1) Updating means for updating the data for defining types of communication services held by the holding means.

(2) Returning means for, when it is determined by the determining means that the type of service requested by a terminal unit is not granted to it, returning to the terminal unit a message that the request cannot be accepted.

The above configuration performs the following action.

In the store-and-forward switching unit, data producing means produces data for defining types of services which can be granted to each of the terminal units and control data needed in order for the terminal unit to perform the granted service as loading data, and loading means transmits the loading data produced by the data producing means to load it into the terminal units. In each of the terminal units, the display means is responsive to the loading data loaded by the store-and-forward switching unit to display types of services which are granted to itself, and control means is responsive to the loading data loaded by the store-and-forward switching unit for making a request to the store-and-forward switching unit for a communication service.

The data holding means holds data for defining types of services which are granted to each of facsimile terminal units, the determining means makes a reference to the data held by the data holding means to determine whether or not a communication service requested by a terminal unit is granted thereto, and the receiving means receives communication data from the terminal unit only when the determining means determines that the communication service requested by the terminal unit is granted thereto.

Furthermore, the updating means updates data for defining types of services held by the holding means. The returning means, when it is determined by the determining means that the type of service requested by a terminal unit is not granted to it, returns to the terminal unit a message that the request cannot be accepted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram of a facsimile terminal unit which is an example of the terminal units of FIG. 1;

FIG. 3A illustrates a service attribute table which is stored in the memory of FIG. 1;

FIG. 3B illustrates another example of the service attribute table which is stored in the memory 13;

FIG. 4B is a flowchart for use in explanation of the operation performed by the CPU of FIG. 1; and FIGS. 5, 6 and 7 illustrate examples of service menus displayed on each of the terminal units of FIG. 1;

DETAILED DESCRIPTION OF THE PREFERRED EMBODIMENTS

Figure 1:
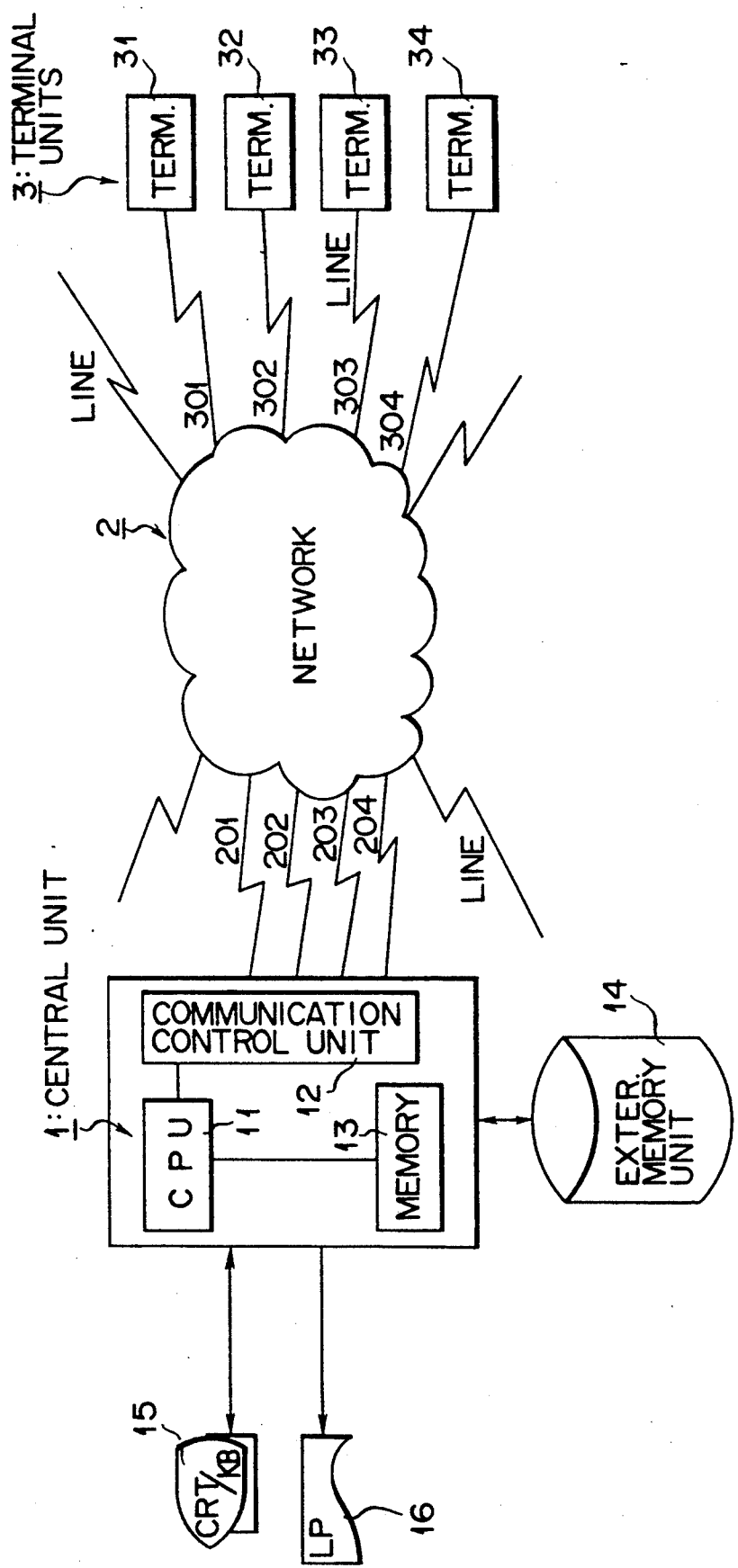
FIG. 1 is a block diagram of a store-and-forward switching system according to an embodiment of the present invention.

Referring now to FIG. 1, there is illustrated a store-and-forward switching system according to the first and second embodiments of the present invention, which is mainly composed of a central unit 1, a network 2 and terminal units 3. Detailed configuration of each system constituent element is as follows.

The central unit 1 is, for example, a facsimile store-and-forward switching unit which control communication with the facsimile terminal units.

The network 2 is, for example, a network such as a public network.

The terminal units 3 are terminal units 31 to 34, such as facsimile terminals, which are coupled to the central unit 1 by the network 2 having a plurality of lines 201-204, 301-304.

The central unit 1 is connected to an external storage unit 14 (e.g. hard disk), a display input unit 15 and a printer 16 such as a line printer. The central unit 1 is composed of a CPU 11, a communication controller 12 (e.g. MODEM) and a memory 13 (e.g. RAM, ROM). The communication controller 12 is connected to the network 2 through lines 201 to 204. The CPU 11 performs such control operations as to temporarily store image data sent from each of the terminal units 31 to 34 in the external storage unit 14 and then transmit the image data stored in the external storage unit 14 in accordance with a requested service and produces loading data to define types of services which can be requested by each terminal.

More specifically, the communication controller 12 permits communication between the central unit 1 and the terminal units 31 to 34.

The memory 13 is a working memory of the CPU 11.

The external storage unit 14 stores image data and its associated various types of information sent from the terminal units 31 to 34 and the loading data.

The display input unit 15 is equipped with a screen (e.g. CRT) for displaying various types of information associated with processing by the central unit 1 and a keyboard (KB) for entering various types of information.

The print output unit 15 is, for example, a line printer (LPT) for printing various types of information processed by the central unit onto paper.

Each of the terminal units 31 to 34 may be a facsimile terminal unit having a display unit (e.g. CRT) 341.

The lines 201 to 204 connect the central unit 1 and the network 2 together.

The lines 301 to 304 connect the network 2 to the terminal units 31 to 34, respectively.

In the system configured as described above, the CPU 11, the memory 13 and the display input unit 15 constitute data producing means for producing data on service menus granted to the terminal units, while the CPU 11 and the communication controller 12 constitute data loading means for loading the data.

FIG. 2 is a block diagram of each of the terminal units 31 to 34 shown in FIG. 1. For example, the facsimile terminal unit is constructed, as shown, such that a ROM 22, a scanner 23, a RAM 24, an image processing unit 25, a recording unit 26, a modem 27, an NCU (Network Control Unit) 28, an input unit 29 and a display unit 30 are coupled through a bus to a CPU 21 for controlling the entire terminal unit.

More specifically, the CPU 21 performs transmission control of a service request to the central unit and data on which the service request was made in accordance with the control procedure defined by predetermined programs and processes of receiving data from the central unit, loading the received data, etc.

The ROM 22 stores programs which run on the CPU to control the present system.

The scanner 23 reads an original to be transmitted for conversion into image data.

The RAM 24 is a storage device with a backup power which stores data, etc., sent from the central unit and data which is necessary in order for the terminal unit to operate.

The image processing unit 25 performs various types of image processing on image data.

The recording unit 26 outputs received data, various types of recorded data, etc., in printed form.

The modem 27 modulates transmit data and demodulates receive data.

The NCU 28 captures and releases a line.

The input unit 29 accepts entry of dialing information entered by an operator, recorded information and various types of commands.

The display unit 30 displays recorded data, loading data, information on operation of the terminal unit, etc., on the display screen.

Note that, in the above system, the CPU 21 and the display unit 30 constitute display means and the CPU 21 constitutes control means for the facsimile terminal unit.

Next, the operation of the first embodiment of the present system will be described.

In FIG. 1, each of the terminal units 31 to 34 is connected to the central unit 1 via the network 2 by dialing. The terminal then sends a service request and image data to the central unit 1. The central unit 1 temporarily stores the service request and the image data sent from the terminal in the external storage unit 14 and then transmits the date to a specified terminal in accordance with the service request.

First, the operator previously enters from the display input unit 15 into the CPU 11 data for determining what types of services are to be provided to each of the terminals placed under the control of himself. The CPU 11 writes the input data into a predetermined area of the memory 13 and records it in the form of such a table as shown in FIG. 3A. The data may be recorded onto a secondary medium such as a floppy disk, magnetic tape, etc.

Here the table shown in FIG. 3A will be described in detail. The table is an attribute table which represents that which types of services (e.g., alternate recipient communication, multi-destination delivery communication, information-box communication, P.O.-box communication, confidential communication, etc.) are granted to each of the terminals 31 to 34. Furthermore, the multi-destination delivery communication has 3 ranks according to the priority of the communication. (i.e. SUPER HIGH-PRIORITY, HIGH-PRIORITY and NORMAL-PRIORITY) In the figure, "ON" stands for "grant", while "OFF" stands for "prohibition". For example, as to the terminal 32, alternate recipient communication, multi-destination delivery communication and information-box communication are granted, while P.O.-box communication and confidential communication are prohibited. As to the other terminals as well, types of services which are granted and prohibited will be seen likewise.

Subsequently, when the operator enters generation commands for loading data to the terminals from the display input unit 15, the CPU 11 refers to the attribute table entered into the memory 13 to generate loading data for each terminal in accordance with a flowchart shown in FIG. 4A.

First, in step A401, the entry of loading data generation commands is waited. When the commands are entered, the operation proceeds to step A402.

In step A402, a reference is made to the table of FIG. 3A in the memory 13, thereby extracting services which are granted to the terminal 31 first. In subsequent step A403, such display data as shown in FIG. 5 is generated on the basis of the extracted data. In subsequent step A404, control data is generated which is needed in order for the terminal unit 31 to make a request for the extracted service to the central unit.

Next, in step A405, the CPU 11 stores the display data and control data which have been generated as described above in a predetermined area of the external storage unit 14 in the form of a file and then carries out step A406.

In step A406, a determination is made as to whether or not files of the display data and control data have been created for all the terminals. If all the files have not been created yet, then the operation returns to step A402. If all the files have been created, on the other hand, the processing terminates.

The control data generated in step A404 has the following function. That is, where a terminal unit requests the central unit to perform a substitute communication service by way of example, after the entry of an address by the operator at the terminal site, the terminal unit must transmit a code of "10" representing the substitute communication and the entered address data to the central unit 1. It is the control data generated in step A404 that controls the transmission of the code "10"

and the address data from the terminal unit to the central unit 1.

Figure 4A:
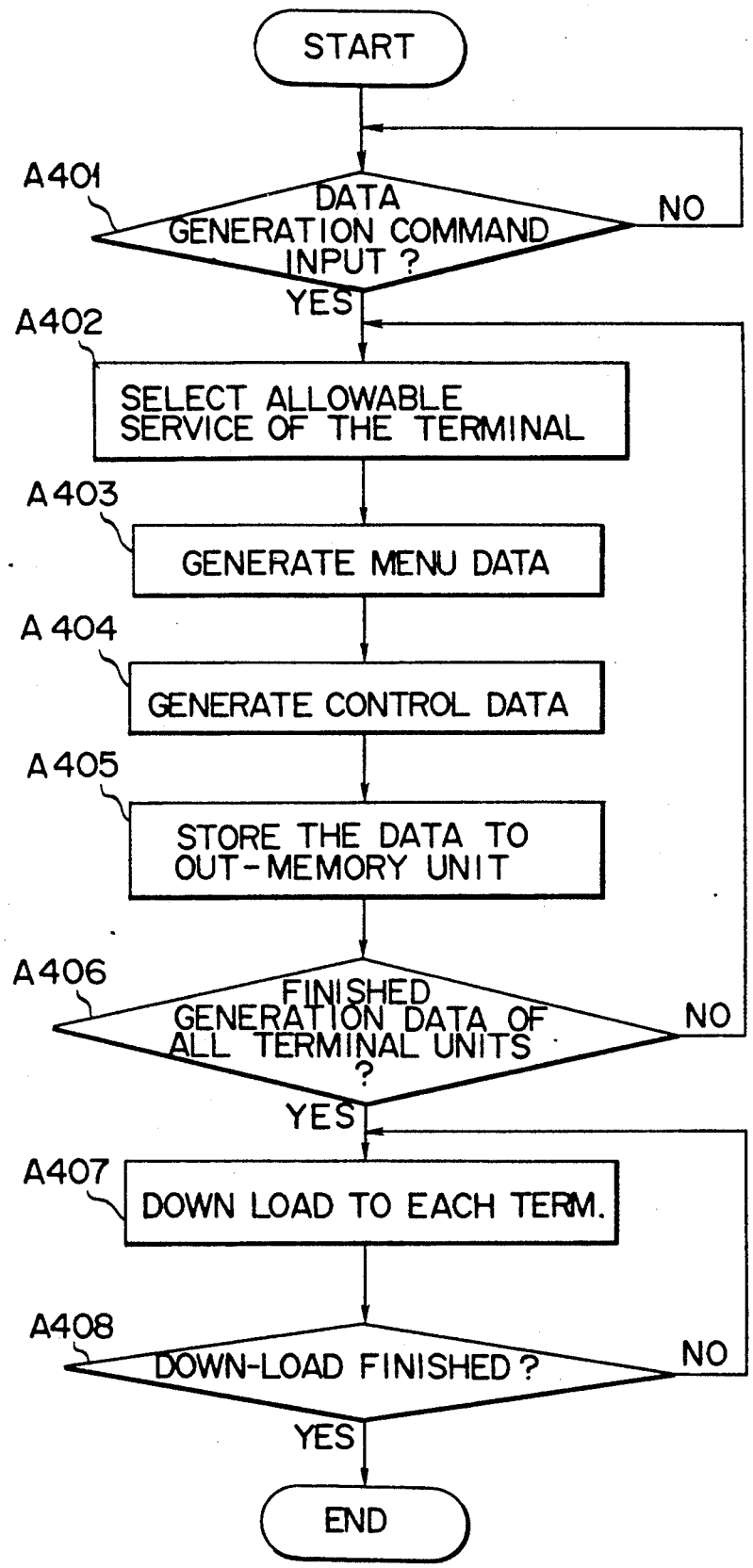
FIG. 4A is a flowchart for use in explanation of the operation performed by the CPU of FIG. 1.

Note here that, because the terminal unit 31 is granted all the services as illustrated in the table of FIG. 3A, when the process shown in FIG. 4A is performed for the terminal unit 31, the control data is generated in step A404 for each of all the services shown in FIG. 3A so that these services will be performed at the terminal unit.

Next, the process shown in the flowchart of FIG. 4A is performed for the terminal unit 32. In this case, however, such display data as shown in FIG. 6 will be generated in step A403 on the basis of the table of FIG. 3A. Further, in step A404, control data needed in order for requests for alternate recipient communication, multi-destination delivery communication (HIGH-PRIORITY and NORMAL-PRIORITY) and information-box communication services to be made by the terminal 32 is generated.

Finally, the steps of the flowchart of FIG. 4A are carried out for the terminal 33. In step A403, such display data as shown in FIG. 7 is generated. Next, in step A404, control data is generated which is needed in order for the terminal 33 to make a request for each of the displayed services to the central unit 1.

After the display data and control data have been generated for the terminals 31 to 34 as described above, they are stored in the external storage unit 14 in the form of files.

Where, at a later time, it is desired to alter the types of services that some terminal may request, it is necessary that service attribute alteration commands be entered from the display input unit 15 into the CPU 11 and only information about that terminal be specified. Then, the CPU 11 will display only the file for the terminal read from the external storage unit 14 on the display input unit 15. Thus, the operator is permitted to rewrite only the data for the terminal using the keyboard of the display input unit 15.

After all the loading data of the terminals 31 to 34 have been determined finally and then filed in the external storage unit 14 by the above procedure, the operator enters loading commands from the display input unit 15 to the CPU 11. This entry operation permits the CPU 11 to call the terminals 31 to 34 in sequence through the communication controller 12. When the lines are connected afterward, the loading data is read from the external storage unit 14 and sent to the terminals together with loading codes.

Upon receipt of the loading data from the central unit 1, each terminal loads it into the RAM 24 shown in FIG. 2 in the following sequence.

That is, each terminal receives the loading code and the loading data transmitted from the central unit 1 via the NCU 28 of FIG. 2. The receive data is demodulated by the modem 27 and then entered into the CPU 21. Upon detection of the loading code, the CPU 21 stores the input loading data in a predetermined area of the RAM 24. By such operation of the CPU 21 at the terminal site, the loading data sent from the central unit 1 is loaded into the RAM 24.

The loading data may be used to activate the central unit from the terminal site for retrieval of corresponding data.

Next, in order for the terminal site operator to cause the central unit to perform, for example, the multi-destination delivery communication service, the operator enters service menu display commands from the input unit 29 of FIG. 2 into the CPU 21. The CPU 21 reads display data of the loading data loaded into the RAM 24 and displays it on the display 30. If the operator is at the terminal 31, such a service menu as shown in FIG. 5 will be displayed. This display permits the operator to see that he is able to receive the broadcast communication service. Thus, the operator selects the second service from the service menu and then enters address information from the input unit 29 after setting an original for the broadcast communication onto the scanner 23. Subsequently, when dial information of the central unit 1 is entered from the input unit 29, the NCU 28 calls the central unit 1.

As a result, when the line is connected, the CPU 21 transmits the broadcast communication service request and address information to the central unit 1 in accordance with the control data loaded into the RAM 24 and then activates the scanner 23 to read data on the original. The data is subjected to binarization and encoding in the image processing unit 25 and then to modulation in the modem 27. The modulated data is sent to the central unit 1 via the NCU 28 and the line 301.

If the operator is at the terminal 32, then such a service menu as shown in FIG. 6 will be displayed by the display unit 30.

Also, if the operator is at the terminal 33, then such a service menu as shown in FIG. 7 will be displayed by the display unit 30.

According to the present embodiment, the following advantages will be obtained. That is, by loading allowable services and control data for performing the services from the central unit 1 into the terminals 31 to 34 to thereby define types of services which are granted to each of the terminals, delays for processes due to an overflow of services can be avoided, permitting the system to be operated smoothly. Moreover, since, at each terminal, the services that are allowed to receive are displayed in the form of a menu by its display unit 30, the terminal site operator will not make a request for a non-allowable service to the central unit 1, thus eliminating useless communications and decreasing system overhead.

If an operator at a terminal wants to receive a new service which is not present in the service menu, he has only to call the central site operator up and have the loading data for that terminal rewritten.

Although, in the present embodiment, the central unit 1, which is a facsimile store-and-forward switching unit, is arranged to generate loading data for display at terminals, types of services have only to be displayed at each terminal site on the basis of loading data sent from the facsimile store-and-forward switching unit. Thus, the system may be arranged such that the terminal site memory stores a plurality of types of display data and the facsimile store-and-forward switching unit may instruct the terminal to display one of them.

It is apparent that other embodiments and modifications are possible.

As described above, according to the present invention, types of services for which a terminal is allowed to make requests to the central unit are defined at the terminal site and the terminal site operator is notified of allowable services beforehand, thus eliminating useless communications.

Next description is the second embodiment of the present invention.

Here in FIG. 1, the external storage unit 14 constitutes holding means, the CPU 11 constitutes determining means, and the CPU 11 and the communication controller 12 constitute receiving means. Moreover, the CPU 11 and the display input unit 15 constitute updating means. Furthermore, the CPU 11, the memory 13 and the communication controller 12 constitute returning means.

FIG. 3B illustrates part of a service attribute table stored in the external storage unit 14. In this service attribute table, information for defining services to be performed by the central unit 1 for each of the terminals is tabulated. For example, the terminal 31 is granted any of emergency, HIGH-PRIORITY and NORMAL-PRIORITY communication services. The terminal 32 is granted the priority and NORMAL-PRIORITY communication services but not the SUPER-HIGH PRIORITY communication service. As to the other terminals as well, it is likewise possible to see that which types of services are granted and prohibited.

Next, upon receipt of the service requests from the terminal units 31 to 34, the CPU 11 of the central unit 1 performs steps in the flowchart of FIG. 4B. That is, one of the terminals 31 to 34, for example, the terminal 34, dials a telephone number which is sent to the network 2 over the line 304. The network 2 issues a calling request to the central unit 1 over the line 204 when it is unused. In response to this request, the following steps are carried out.

That is, the CPU 11 of the central unit 1 detects the call by means of the communication controller 12 in step B401 and then the service request (it is supposed here to be for NORMAL-PRIORITY multi-destination delivery communication service) by the terminal 34 is input in step B402. At this point, the CPU 11 reads such a service attribute table as shown in FIG. 3B from the external storage unit 14 and loads it into the memory 13. Then, the operation proceeds to step B403.

In step B403, a reference is made to the service attribute table on the memory 13 to determine whether or not the NORMAL-PRIORITY multi-destination delivery communication service is granted to the terminal 34.

The service attribute table shown in FIG. 3B indicates that the terminal 34 is granted the NORMAL-PRIORITY multi-destination delivery service. In step B404, the CPU 11 determines that the service is granted.

In step B405, the communication controller 12 performs pre-processing of protocol communication between the central unit 1 and the terminal 34. In subsequent step B406, the central unit 1 receives image data from the terminal 34 via the communication controller 12 and stores it in the external storage unit 14.

In step B407, the communication controller 12 performs post-processing of the protocol communication and then disconnects the line.

Next, the CPU 11 writes the latest communication result into a predetermined area of the memory 13 and then terminates the process.

The above process was described by taking, as an example, the case where the terminal 34 made a request for NORMAL-PRIORITY broadcast communication. In the case of a request for NORMAL-PRIORITY communication service, the CPU 11 makes a reference to the service attribute table in step B403 and determines that the NORMAL-PRIORITY communication service is not granted to the terminal 34 in step B404. Then, the operation proceeds to step B409.

In step B409, predetermined protocol communication is performed for reversal of transmission and reception and then a message that the NORMAL-PRIORITY broadcast communication service is not granted to you and thus the request cannot be accepted is read from the memory 13 and then transmitted to the terminal 34 via the communication controller 12.

Next, the CPU 11 disconnects the line in step B410 and then proceeds to step B408.

In step B408, the CPU 11 records the rejection of a NORMAL-PRIORITY communication service request made by the terminal 34 in the memory 13, thereby terminating the entire process.

For a service request made by another terminal as well, the CPU 11 makes a reference, without fail, to the service attribute table of FIG. 3B in step B403 to determine whether or not the requested service is granted to the terminal. As a result, the operation proceeds to step B405 only when the service is granted and then the same process as above is carried out.

When the service is not granted, on the other hand, the service request is rejected and the line is disconnected. In the above system, the SUPER HIGH-PRIORITY communication service is granted only to the terminal 31. Therefore, even if the operators at the terminals 32 to 34 make a request to the central unit 1 for the SUPER HIGH-PRIORITY communication, the request will be rejected.

When the operator enters commands for taking communication records out into the CPU 11 through the display input unit 15, the CPU reads communication record data from the memory 13 and prints the data onto paper by means of the line printer 16. The printed output permits the operator to see that, for example, the terminal 34 made a request for NORMAL-PRIORITY multi-destination delivery communication service, but the line was disconnected because the service was not granted to the terminal 34. In this case, when the operator wants to grant the HIGH-PRIORITY multi-destination delivery communication service to the terminal 34, the operator may enter data for updating the service attribute table from the display input unit 15 into the CPU 11 so as to rewrite the table so that the terminal 34 will be granted the HIGH-PRIORITY multi-destination delivery communication service as shown in FIG. 5.

If, in this case, the operator enters commands for taking the service attribute table out into the CPU 11, the CPU 11 will read the updated table shown in FIG. 5 from the external storage unit 14 and prints out the table information by the line printer 16. This permits the operator to verify the contents of the updated service attribute table visually.

On the other hand, the terminal site operator, who received a message that the requested service cannot be provided in step B409, may make a request to the central unit for the normal multi-destination delivery communication service which is below the SUPER HIGH-PRIORITY multi-destination delivery communication service and HIGH-PRIORITY multi-destination delivery communication service in rank or may call the central site operator so that the HIGH-PRIORITY multi-destination delivery communication service or SUPER HIGH-PRIORITY multi-destination delivery communication service may be granted. As a result, if the central site operator rewrites the service attribute table so that the HIGH-PRIORITY multi-destination delivery communication service can be granted to the terminal 34, then the terminal 34 will be able to make a request to the central unit 1 for HIGH-PRIORITY multi-destination delivery communication service without being rejected.

It goes without saying that 1, after acceptance of a service request, the central site CPU 1 stores receive image data in the external storage unit 14, reads the image data from the external storage unit 14 and then transmits it to the designated terminal.

According to the present embodiment, whenever a service request is made by a terminal, the central unit 1 makes a reference to the service attribute table to determine whether or not the requested service is to be performed. If the service is not granted to the terminal, the central unit disconnects the line to the terminal, thereby rejecting the service request. Therefore, it becomes possible to avoid a situation in which many requests for the same service occur at the same time and transmission delays occur, permitting the system to perform communication services smoothly at all times.

As can be seen from the service attribute table shown in FIG. 3B, for example, the SUPER HIGH-PRIORITY multi-destination delivery communication service is granted only to the terminal 31. Thus, it becomes possible to avoid the problem that all the terminals make a request for the SUPER HIGH-PRIORITY multi-destination delivery communication service and the SUPER HIGH-PRIORITY multi-destination delivery communication service stops functioning properly. In this case, if the terminal 31 makes a request for the SUPER HIGH-PRIORITY multi-destination delivery communication service, image data from the terminal 31 will immediately be transmitted to a designated terminal through the central unit 1.

Defining of types of services for each of terminals can be implemented by the service attribute table in the central unit 1 and a program which makes a reference to the table when a service request is made by a terminal and accepts only requests for granted services. As a result, the service defining function can be realized without the necessity of adding of parts constituting the system itself and modifying of the system control and operation in a more complicated manner. In particular, the terminals may be the same as those in conventional systems in structure, permitting the system itself to be constructed inexpensively.

As described above, according to the present invention, there can be provided a store-and-forward switching system which permits prevention of the degradation of performance due to an overflow of services.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. In a store-and-forward switching system which comprises a plurality of terminal units and a store-and-forward switching unit coupled to said terminals units through a network for loading data into said terminals and which temporarily stores a communication service request and data on which the communication service is to be performed which are sent from a terminal, reads the data in accordance with the communication service and performs a process specified by the communication service on the data, said store-and-forward switching unit comprises:
data producing means for producing data for defining types of services which are granted to each of said terminal units upon request and control data needed for said terminal units to perform the granted services as loading data; and
loading means for transmitting the data produced by said data producing means to load said data into said terminal units, each of said terminal units comprises:
display means responsive to the loading data loaded by said store-and-forward switching unit for displaying types of services which are granted to said terminal units; and
control means responsive to the loading data loaded by said store-and-forward switching unit for making a request to said store-and-forward switching unit for a communication service.

2. A store-and-forward switching system according to claim 1, in which said store-and-forward switching unit further comprises a display input unit for displaying data produced by said data producing means or entering data; and
a printer for printing out the data.

3. A store-and-forward switching system according to claim 2, in which each of said terminal units is a facsimile terminal unit, and
said store-and-forward switching unit is a facsimile store-and-forward switching unit.

4. A method of controlling a store-and-forward switching system comprising the steps of:
waiting for entry of commands for producing loading data;
referring to a table within a memory to extract data on a service which is granted to a terminal;
producing display data based on the extracted data;
producing control data which is required when said terminal makes a request to a central unit for the service;
storing the display data and the control data in a predetermined area of an external storage unit in a form of a file; and
producing the display data and the control data for each of terminal under control;
determining whether or not the display data and the control data have been filed for all terminals;
returning to the extracting step if the display data and control data have not been filed for all terminals; and
terminating the process if the display data and control data have been filed for all terminals.

5. A method of controlling a store-and-forward switching system according to claim 4, in which the display data producing step produces the display data based on of the table.

6. A method of controlling a store-and-forward switching system according to claim 4, in which the control data producing step produces control data needed in order for a terminal to make a request to said central unit for each service including substitute communication, multi-destination delivery communication and information-box communication services.

7. In a store-and-forward switching system which comprises a plurality of terminal units and a store-and-forward switching unit coupled to said terminals units through a network and in which said store-and-forward switching unit temporarily stores a communication service request and data on which the communication service is to be performed which are sent from a terminal, reads the data in accordance with the communication service and performs a process specified by the communication service on the data, said store-and-forward switching unit comprises:
data holding means for holding data for defining types of services which are granted to each of said terminal units;
determining means for making a reference to the data held by said data holding means and determining whether or not a communication service requested by a terminal unit is granted; and
receiving means for receiving communication data from the terminal unit only when said determining means determines that the communication service requested by the terminal unit is granted.

8. A store-and-forward switching system according to claim 7, further comprising updating means for updating the data for defining types of communication services held by said holing means.

9. A store-and-forward switching system according to claim 7, further comprising returning means for, when said determining means determines that the service requested by the terminal unit is not granted thereto, returning to the terminal unit a message that the service request cannot be accepted.

10. A method of controlling a store-and-forward switching system comprising a store-and-forward switching central unit and a plurality of terminal units comprising the steps of:
detecting a call from a terminal unit through a communication control unit for controlling communication between said central unit and said terminal units;
reading a service attribute table from an external storage unit and loading it into a memory;
referring to said service attribute table on said memory of said central unit to determine whether or not a NORMAL-PRIORITY multi-destination delivery communication service is granted to said terminal unit;
determining that the NORMAL-PRIORITY multi-destination delivery communication service is granted to said terminal unit based on a value of predetermined data in said service attribute table;
performing pre-processing of protocol communication with said terminal unit through a communication control unit;
receiving image data from said terminal unit via said communication control unit and storing it in said external storage unit;
performing post-processing of said protocol communication through said communication control unit to disconnect a line; and
writing latest communication results into a predetermined area of a memory and then terminating a series of processing steps.

11. A method of controlling a store-and-forward switching system according to claim 10, in which said determining step proceeds to the next step when it is determined that the service is not granted.

12. A method of controlling a store-and-forward switching system according to claim 10, further comprising the steps of:
reading a message that a HIGH-PRIORITY multi-destination delivery communication service is not granted to a terminal unit and thus such a request cannot be accepted from a memory and transmitting said message to said terminal unit after performing predetermined protocol communication for reversal of transmission and reception;
writing a record that a request for the HIGH-PRIORITY multi-destinaion delivery broadcast communication service made by a terminal was not accepted because the request is not granted to the terminal into a memory, thereby terminating the entire process;
rejecting a service request when the request is not granted to disconnect a line; and
disconnecting a line for termination.

* * * * *